INVENTOR.
HARRISON D. BRAILSFORD
BY
ATTORNEYS

Aug. 2, 1966  H. D. BRAILSFORD  3,264,538
BRUSHLESS TRANSISTOR COMMUTATED MOTOR
Filed Dec. 6, 1961  2 Sheets-Sheet 2

INVENTOR.
HARRISON D. BRAILSFORD
BY Gillette & Virgil
ATTORNEYS

United States Patent Office 3,264,538
Patented August 2, 1966

3,264,538
BRUSHLESS TRANSISTOR COMMUTATED MOTOR
Harrison D. Brailsford, 670 Milton Road,
Rye, N.Y.
Filed Dec. 6, 1961, Ser. No. 158,642
6 Claims. (Cl. 318—138)

This invention relates to brushless transistor commutated direct current motors having provisions for self starting. In particular, the invention relates to an improved circuit and running coil arrangement for such motors and to means for starting the motors.

This is a continuation-in-part of my co-pending application Ser. No. 85,053, filed January 26, 1961, and now abandoned.

Direct current electric motors using transistors or the like for commutating the driving winding of the motor, such as those described in by United States Patents 2,719,944 and 2,769,946, have heretofore required separate pick-up windings to generate signals to operate the transistor circuits. Furthermore, such motors have not been inherently self-starting.

It is a principal object of the present invention to provide an improved direct current electric motor in which commutation is accomplished by means of solid state devices, such as transistors, and in which the coil structure is simplified so that the same coil operates at one time as a running coil and at another time as a pick-up or control coil. Another object is to provide a motor of the foregoing type that is inherently self-starting and that always starts in the same direction. A further object is to provide switching means which may be used as a starting device for a motor of the type described.

The basic components of a motor constructed in accordance with the principles of the present invention include a permanently magnetized armature, a stationary field structure in which the armature is mounted and, which includes a pair of coils, and a transistor circuit connected to the coils to control the current flowing through each of the coils in alternation while being controlled by the current flowing in the other coil. In addition, the invention includes means to cause the armature to come to rest at a predetermined position with respect to the field structure during periods when the motor is not connected to a source of operating current. Such means may include a ferromagnetic core portion of the field structure, and the reason for providing such means is to assure that the armature will be in a position to cause it to start rotating as soon as the circuit is energized from an electrical power source, thereby making the motor self-starting.

A motor constructed according to the principles of this invention may operate either as an oscillator with the armature moving back and forth or it may operate as a continuously rotating device in which the armature is in the form of a rotor that turns in one direction as long as the motor is connected to a source of power.

In order to assure that the armature always starts in the same direction, additional contact means may be provided to be actuated by the armature or by means associated therewith to energize the transistors alternately in order to energize the coils alternately and in proper timing relationship.

The invention will be described in greater detail in connection with the drawings, in which.

Figure 1:
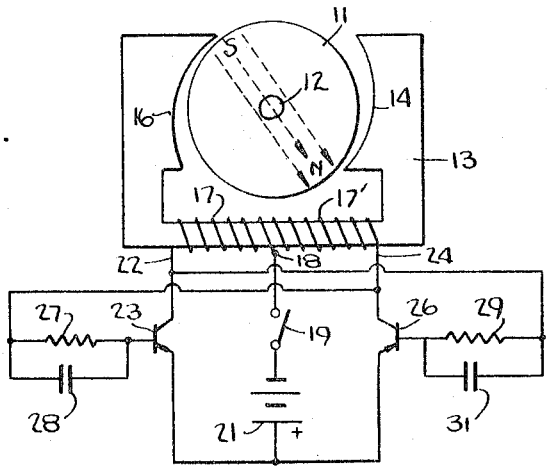
FIG. 1 shows a motor constructed according to the invention with the armature free to rotate continuously in one direction.

The motor in FIG. 1 comprises an armature, or rotor, 11 rotatably supported on a shaft 12 which may be supported by conventional bearings (not shown). Adjacent to the rotor is a stator structure comprising a core 13 of ferromagnetically soft material having a pair of pole faces 14 and 16 symmetrically spaced on opposite sides of the rotor 11. Both of the pole faces 14 and 16 are rounded and are so shaped that the gap between them and the perimeter of the rotor 11 is greater at one edge and tapers to a narrower gap at the other edge.

An energizing coil is wound on the ferromagnetically soft core 13 and comprises a coil having a left-hand portion 17 and a right-hand portion 17' joined by a center tap 18. The center tap 18 is connected to a switch 19 which in turn is connected to a source 21 of operating electrical voltage, such as a battery. The outer end 22 of the coil 17 is connected to the collector of a transistor 23, the emitter of which is connected to the positive pole of the battery 21. The outer end 24 of the coil 17' is connected to the collector of a transistor 26, the emitter of which is also connected to the positive pole of the battery 21.

The two transistors are connected in a flip-flop circuit, the feed-back portions of which comprise two resistance capacitance circuits. The first of these consists of a resistor 27 connected in parallel with a capacitor 28 and with this parallel circuit connected in series between the collector of transistor 26 and the base of transistor 23. A similar circuit comprising a resistor 29 connected in parallel with a capacitor 31 is connected in series between the emitter of transistor 23 and the base of transistor 26.

The rotor 11 which consists of a permanent magnetic material, such as Alnico, is magnetized so as to have a north magnetic pole at one limited area of its perimeter and a south magnetic pole at the diametrically opposite area of the perimeter. Because of the tapered gap between the rotor 11 and the pole faces 14 and 16, the rotor stops in one of two positions when the switch 19 is open as is the case in FIG. 1. The positions are such as to minimize the reluctance of the magnetic path which includes the magnetized rotor 11, the ferromagnetically soft core 13, and the air gaps between the rotor and the pole faces 14 and 16. This means that the rotor will stop with the north and south poles adjacent the closest points of the pole faces 14 and 16, either in the position shown in FIG. 1 or in the reverse position with the north pole N and the south pole S in reversed positions. As a result, when the switch 19 is closed to start the motor a magnetic field is established in the core 13 by virtue of current flow either in the coil 17 or in the coil 17' depending upon whether transistor 23 or transistor 26 first becomes conductive. As is well known, only one of the transistors can become conductive at a time and as soon as one of them starts to conduct a signal will be transmitted from its collector through the feedback circuit to the base of the other transistor to hold the other transistor non-conductive. In order to simplify the description it will be assumed that the transistor 26 becomes conductive first. The direction of current flow through the coil 17' connected in series with the emitter-collector circuit of transistor 26 is such as to make the pole face 16 assume a north magnetic polarity and the pole face 14 a south magnetic polarity.

Since the magnetic axis through the centers of the pole faces 14 and 16 under this magnetic polarity will be slightly less than 45° from the magnetic axis of the rotor 11 in its "at rest" position, the rotor can only be caused to move through this less-than-45° angle. As soon as the rotor moves, however, its magnetic field induces a voltage in the coil 17 of proper polarity to deliver a positive pulse to the base of transistor 26 through the coupling network consisting of resistor 29 and capacitor 31. This causes transistor 26 to become non-conducting which, in accordance with the well-known mode of operation of flip-flop circuits, immediately renders transistor 23 conducting thereby energizing the left-hand coil section 17 and reversing the magnetic field in the field structure 13. This causes the pole face 16 to take on a south magnetic polarity and the pole face 14 to take on a north magnetic polarity, which produces a magnetic axis between the two pole faces that tends to urge the rotor 11 almost 180° in a clockwise direction. Thus, the preferential direction of start will always be clockwise for the structure and connections shown.

Figure 2:
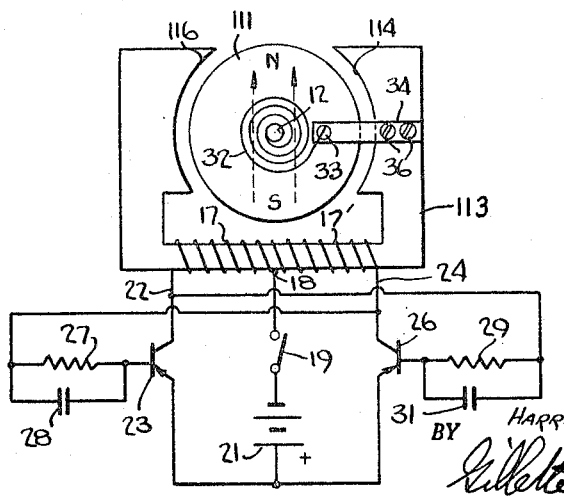
FIG. 2 shows a motor constructed according to the invention with the armature limited to oscillatory movement.

FIG. 2 shows a structure generally similar to that of FIG. 1, although it will be appreciated by those skilled in the art that in neither case is the invention limited to the exact structure shown. In FIG. 2 a permanently magnetized armature 111 is pivoted at its center on a shaft 12 and magnetized with north and south poles diametrically opposite, as indicated by the letters N and S. The armature 111 is supported so as to be free to oscillate back and forth within a stationary field structure including a ferromagnetic portion 113. Coils 17 and 17' are wound on a leg portion of the ferromagnetic portion 113 which terminates in a pair of opposed pole faces 114 and 116.

Since the armature 111 is to oscillate back and forth, there is no need for a preferential starting direction, and the gaps between the pole faces 114 and 116 and the armature 111 may be uniform instead of tapered, as the gaps were in the structure of FIG. 1. Where the structure of FIG. 1 used the magnetic field of the rotor and the tapering air gaps to attract the rotor to a rest position angularly displaced from the magnetic axis established between the pole faces when the motor is connected to a source of operating current, the structure of FIG. 2 relies upon a spring 32 attached to the shaft 12 and to a clamping device 33 on a support member 34. The latter is attached to the field structure 113 by machine screws 36. The tension of spring 32 is such as to maintain the armature 111 with its magnetic axis perpendicular to a line drawn between the centers of the pole faces 114 and 116. The coils 17 and 17' and the transistor circuit connected thereto are the same as the corresponding elements of FIG. 1.

Closing the switch 19 applies a voltage to the transistor circuit and, as is well understood in the art, one or the other of the transistors 23 and 26 will immediately become conductive and, by so doing, maintain the other transistor in a non-conductive state. Assume that, for example, transistor 23 conducts first; the resulting magnetic field through the coil section 17 will immediately cause the armature 111 to move so as to bring the north pole N of the armature closer to the pole face 116. When the armature moves in this direction, its magnetic field induces a voltage in coil section 17' of proper polarity to deliver a positive pulse to the base of the transistor 23 through its RC coupling network. This cause transistor 23 to become non-conducting which immediately renders transistor 26 conducting, energizing coil section 17' to reverse the magnetic field induced in the field structure 113 and to urge the armature 111 in the reverse direction. Since the armature 111 is held to a limited movement by the spring 32, a continuous oscillatory motion of the armature is thereby developed; the frequency of which will be a function of the moment of inertia of the armature 111 and the compliance of the spring 32, as is well known. This mechanism, being oscillatory, is ideally suited to drive clocks and other time interval measuring devices.

Figure 3:
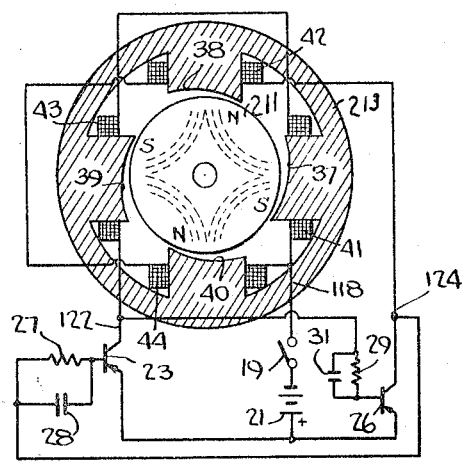
FIG. 3 shows a modification of the embodiment of FIG. 1.

A multi-pole form of the motor is shown in FIG. 3. In this figure the armature 211 has two north poles, indicated by the letters N, which are diametrically opposite each other and two south poles, indicated by the letters S, which are also diametrically opposite each other and half way between the two north poles. The soft iron stator structure 213 is in the form of a ring with four salient poles having pole faces 37, 38 39 and 40. As in FIG. 1 the air gap between the pole faces and the periphery of the armature 211 tapers in the direction in which the armature will rotate. Instead of a single center-tapped winding, the winding of FIG. 3 is divided into four sections 41–44 which are wound, respectively, on the salient poles 37–40. The windings 41 and 43 are connected in series and the windings 42 and 44 are also connected in series. A terminal 118 corresponding to the center-tap 18 of FIG. 1 is the common junction of the two sets of windings, while the outer terminals of the two divided windings are indicated, respectively, by reference numbers 122 and 124 and are connected to the transistors 23 and 26. Therefore, it may be seen that electrically the circuit of FIG. 3 is the same as the circuits of FIGS. 1 and 2.

Operation of the structure of FIG. 3 begins with the closure of the switch 19 which makes one of the transistors conductive. Assuming that transistor 23 is the one that becomes conductive initially, current will flow from the battery 21 through the emitter-collector circuit of the transistor 23 and through the windings 43 and 41. The windings 43 and 41 must be wound in opposite directions so that both pole faces 37 and 39 become magnetized with south magnetic polarity, and at the same time the poles 38 and 40 assume the north magnetic polarity. As in the case of the motors in FIGS. 1 and 2, there is an angular displacement between magnetic axis of the armature 211 in its rest position and the magnetic axis of the poles 37–40 established when the switch 19 is closed. This angle means that the armature 211 must move when the magnetic field is set up in the poles 37–40 by current flowing in either the coils 41 and 43 or coils 42 and 44, and the reason that the armature must move is to attempt to align its magnetic field with that of the field structure poles, i.e., to establish maximum magnetic flux linkage between the two. The direction of motion of the armature 211 under the conditions postulated is in the clockwise direction.

As the armature 211 rotates in a clockwise direction, the magnetic fields of its poles N and S induce voltages across the coils 41–44 that operate to render the transistor 23 non-conductive and the transistor 26 conductive at the proper time to keep the armature 211 rotating. Because of the four pole structure there will be four motive impulses per revolution instead of only two—and as in the case of the other embodiments, the same coils serve both as driving windings and as pick-up coils, thus eliminating the necessity for separate pick-up coils.

In the motor of FIGS. 1 and 3 preferential direction of rotation was accomplished by means of an eccentrically formed magnetic gap having a decreasing length in the direction of rotation as has been set forth above. However, it has been found that under certain abnormal conditions of service the motor can be made to start or run in reverse. A specific example of such conditions includes failure of the starting switch 19 to make positive contact so that in the initial fraction of a second after the switch has been mechanically actuated, a series of intermittent pulses is produced preceding the final closure of the switch. A related example producing the same effect arises when the switch 19 is the contact portion of a relay and the contacts bounce when the relay is energized. Another cause for reversal of rotation may be a suddenly applied intermittent load equal to or exceeding the stall torque of the motor.

In order to overcome the possibility of reverse operation, an inertially controlled starting switch mechanism may be used. One type of such mechanism is similar to the starting switch mechanism in my copending application Serial No. 5,846 and is shown in FIG. 4.

Figure 4:
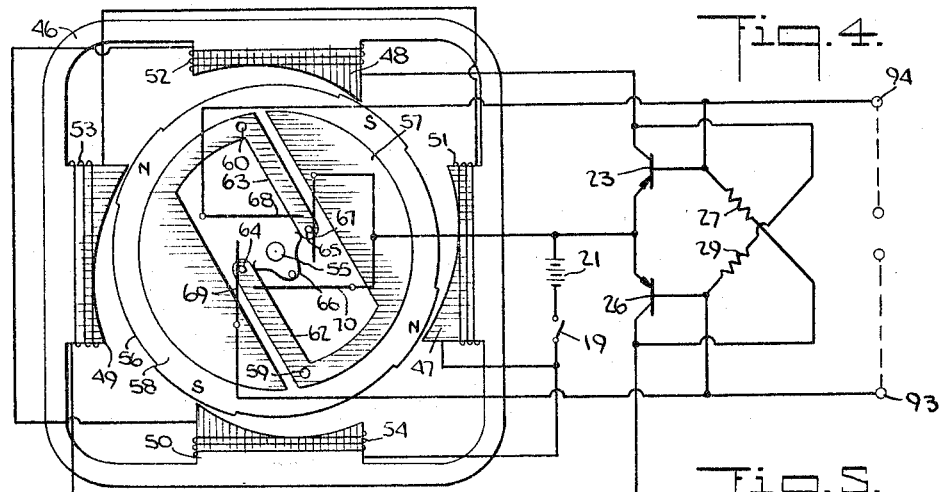
FIG. 4 shows a motor similar to that of FIG. 3 with a separate starter mechanism.

In FIG. 4, the stator structure comprises a frame of soft iron 46 or other suitable ferromagnetically soft material having four salient poles 47–50 corresponding to the poles 37–40 of FIG. 3. Each pole has wound on it a coil referred to, respectively, by reference characters 51–54. Coils 51 and 53 are connected in series and coils 52 and 54 are likewise series-connected. Centrally and rotatably supported within the stator or field structure 46 on a shaft 55 is an armature 56 in the form of a rotor of ferromagnetic material having a high coercive force and so magnetized as to have two north and two south poles indicated, respectively, by the letters N and S alternately spaced around its circumference, with diametrically opposite poles being of like polarity. While the latter poles are indicated as being salient, it is not necessary that the armature be made with this configuration; instead, it may be perfectly round and in the form of a short cylinder.

The starting mechanism itself comprises a pair of weights 57 and 58 pivotally attached to the armature 56 by means of pins 59 and 60, respectively, and having extension arms 62 and 63 that terminate in contact pins 64 and 65, respectively. A spring 66 bears against the extension arms 62 and 63 to force them apart and thereby to draw the weights 57 and 58 in toward the center of the shaft 55. As a direct result of the resilient biasing of the spring 66, the contact pins 64 and 65 are spread apart and away from the center of the shaft 55 when the latter, together with the armature 56, is at rest. In this position contact pins 64 and 65 are in proper alignment to bear against or to make contact with four resilient contact members in the form of flexible spring wires 67–70 which are fixedly supported with respect to the field structure 46. It should be noted that while the positions of the pivot pins 59 and 60 are fixed with respect to the armature 56, it is not necessary that these pins be inserted into the armature itself; on the contrary, they may be held in place on an additional member (not shown) which is affixed to the shaft 55 to rotate therewith, along with the armature 56.

As was described in connection with FIGS. 1 and 3, when the armature is at rest, the magnetic fields of its permanently magnetized poles will cause it to assume one of two possible magnetic alignments with respect to the stator poles 47–50 and one of these positions is illustrated in FIG. 4. The alternative position is with the armature rotated by 90°, so that the north poles N would be in the positions shown for the south poles S, and vice versa.

The running circuit of the motor is similar to that shown in all three of the preceding figures of the drawing and consists of a pair of transistors 23 and 26 each having an input circuit and an output circuit. In the embodiment shown the transistors are PNP types and are operated in grounded emitter circuits. The emitter terminals of the two transistors are connected together to one terminal of a suitable electrical power source such as the battery 21, while the collector terminal of the transistor 23 is connected to one end of the coil 54 so as to place the output circuit of transistor 23 in series with coils 52 and 54. The collector of transistor 26 is connected to one end of the coil 53 so as to place the output circuit of transistor 26 in series with the coils 51 and 53, and the other ends of the coils 51 and 54 are connected together and through a switch 19 to the other terminal of the voltage source 21 to complete the circuit through which the coils are energized. A feed-back resistor 27 connects the collector of the transistor 26 to the base of the transistor 23, and a symmetrical feed-back resistor 29 connects the collector of the transistor 23 back to the base of the transistor 26. Contact spring wires 67 and 70 are both connected to the common emitter junction of the two transistors. Contact spring wire 68 is connected to the base of transistor 23 and contact spring wire 69 to the base of transistor 26.

In the starting position of the armature as shown in FIG. 4, the contact spring wires 67 and 69 are directly connected together by means of the spring 66 and the two contact pins 64 and 65. As a result, the base of transistor 26 is directly connected to the positive terminal of the voltage source 21. This renders transistor 26 non-conducting at the outset, since it is well known that a PNP transistor, such as transistor 26, cannot conduct so long as its base terminal is held at a positive voltage. Since no current can flow through the base of transistor 26 under this condition, the circuit formed by the spring contact wire 67, the contact pin 65, the spring 66, the contact pin 64, and the spring contact wire 69 does not conduct any current, except for the reverse leakage current of the particular transistor, which in any case would be negligible. With transistor 26 rendered non-conducting, transistor 23 would conduct in accordance with the well known fundamental characteristic of a flip-flop circuit.

With transistor 23 conducting, current from the voltage source 21 will flow through the output circuit of the transistor 23 which means that it will flow through the coils 52 and 54. This sets up an electromagnetic field in the stator structure 46 wherein the poles 48 and 50 become south poles momentarily and poles 47 and 49 become north poles. The resulting magnetic reaction between the electromagnetic field of the stator structure 46 and the permanent magnetic field of the armature 56 will therefore cause the armature to be advanced clockwise.

As the rotor 56 revolves, the contact pins 64 and 65 move out of engagement with the spring wires 69 and 67, respectively, removing the positive voltage from the base of transistor 26. The armature continues to revolve until contact pins 64 and 65 come into engagement with spring wires 68 and 70, respectively. At this position the armature 56 will have assumed a position approximately one-fourth of a revolution clockwise from its starting point so that its two south poles are opposite the stator poles 47 and 49 and its two north poles are opposite the stator poles 48 and 50. By virtue of the engagement between the contact pins 64 and 65 and the spring wires 68 and 70, a positive voltage is now applied through a circuit including the spring wire 70, the contact pin 65, the spring 66, the contact pin 64 and the spring wire 68 to the base of transistor 23, thereby rendering that transistor non-conducting. By virtue of the well known flip-flop action the transistor 26 becomes conducting, thus permitting current to flow through the coils 51 and 53 and causing the stator poles 47 and 49 to become south poles and the poles 48 and 50 to become north poles. The result of the interaction of the magnetic fields established by current flowing in the coils 51 and 53 interacting with the magnetic fields of the armature 56 causes the armature to continue to move clockwise in a repetition of the sequence previously described.

It will thus be clear that during the starting phase of the motor the driving pulses generated in the flip-flop circuit are timed and controlled by means of the sequential electrical contacts between the pins 64 and 65 and the spring wires 67–70 and that these contacts, furthermore, control the flip-flop circuit by suppressing current flow in the inactive transistor. Since the spring wires 67–70 are connected to the input circuits of the transistors, they need carry at most only infinitesimal currents and may be made of relatively light construction in even a heavy duty motor since they will not be subject to contact wear or pitting after long periods of service.

The armature 56 accelerates through each of the quarter revolution steps just described until it reaches the running speed of the motor. As the armature accelerates, centrifugal force, acting upon the weights 57 and 58, tends to cause them to swing outwardly about the pivot pins 59 and 60 so that their respective extension arms 62 and 63 with the attached contact pins 64 and 65 move inwardly toward the shaft 55. The spring wires 67–70 are so located that at some predetermined rotational speed the contact pins 64 and 65 will have been withdrawn inwardly sufficiently so as not to make contact with them. When this occurs the flip-flop circuit continues to operate but the transistors 23 and 26 in this circuit are rendered alternately conductive by the voltage pulses generated in the coils 51 and 53 and the coils 52 and 54, as described previously in connection with FIG. 3.

Figure 5:
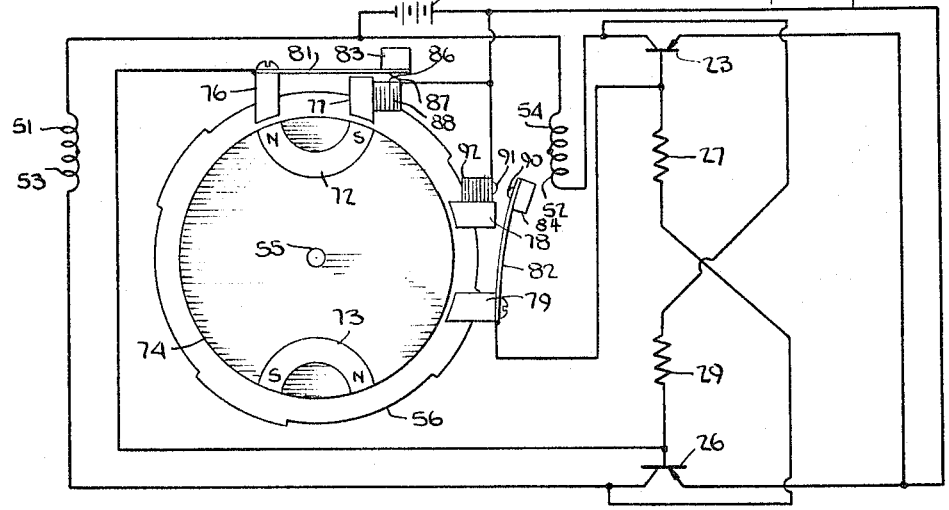
FIGS. 5 and 6 show a modification of the circuit and starting arrangement of the motor in FIG. 4.

Another form of inertially controlled starting switch mechanism is shown in FIG. 5, which is a simplified drawing of the basic electrical circuit alone and does not show the iron stator structure 46, which may be identical to that shown in FIG. 4. The armature 56 has permanent magnetic fields which are used to operate magnetic switches. In the embodiment shown in FIG. 5 the permanent magnetic fields are produced by a pair of magnets 72 and 73 which are embedded in or rigidly attached to a disc 74 that is attached to the armature 56. The discs 74 may be of plastic, brass or other suitable non-ferrous metal or it may be a ferromagnetic material having a high coercive force with the magnetic poles permanently magnetized in local areas thereof. The magnets 72 and 73 are arranged on opposite sides of the disc 74 so that corresponding parts of the magnets are about 180° apart.

Two pairs of shoes, or brackets, 76, 77 and 78, 79 made of soft iron or another suitable ferromagnetically soft material are fixedly attached to the stator portion of the motor and are positioned as shown so that, as the magnets 72 and 73 rotate, their poles pass adjacent to these pairs of brackets in succession. Each pair of brackets supports an associated assembly including a flat spring of magnetic material. In the one case, the spring is indicated by reference character 81 and in the other case by reference character 82. The spring 81 has a weight 83 at its outer end to adjust its natural vibrating frequency, and the spring 82 has a similar weight 84 at its outer end for the same purpose. In addition to the weight 83, the spring 81 has a contact 86 which makes connection with a fixed contact 87 that is supported on an insulating block 88 attached to the bracket 77. Similarly, a contact 90 on the spring 82 connects with a fixed contact 91 attached to an insulating block 92 on the bracket 78. The fixed contacts 87 and 91 take the place of the spring wires 67 and 70 of FIG. 4 and are directly connected together and are connected to one terminal of the voltage source 21. The springs 81 and 82 take the place of the spring wires 68 and 69 of FIG. 4 and are connected, respectively, to the bases of transistors 23 and 26.

The operation of the starting mechanism of FIG. 5 can be explained as follows: The armature 56 is shown at rest in one of its four possible static positions. In this case the poles of the magnet 72 are in alignment with the iron brackets 76 and 77. Magnetic flux flows from the north pole N of the magnet 72 through the soft iron bracket 76, the iron spring 81, the soft iron bracket 77, and returns to the south pole S of the magnet 72. The spring 81 is thus attracted toward the bracket 77, bringing contacts 86 and 87 together. In this position the base of transistor 26 is at positive potential and the transistor 23 will become conducting thus energizing the field coils 52 and 54, which are shown as two halves of a center-tapped coil, which is what they are in effect. As a result, the armature 56 will be advanced clockwise for about 90° as was described in connection with FIG. 4.

When the armature has advanced one-fourth of a revolution, the magnet 72 is in alignment with the brackets 78 and 79 and the spring 81, being no longer subject to the flux of magnet 72, returns to its open position thereby opening the contacts 86 and 87. On the other hand, the magnetic flux of the magnet 72 flows through the brackets 78 and 79 and the spring 82 and causes the latter to bring the contact 84 into connection with the contact 91. The base of transistor 23 is now at positive potential, which renders this transistor non-conducting, but in the well known manner of a flip-flop the other transistor 26 conducts and the field coils 51 and 53 are energized to advance the armature another one-fourth of a revolution. At this point the sequence begins again but with the magnet 73 furnishing the flux to close the contacts 86 and 87.

It will be noted that the active member, i.e. the spring 81 or 82, of each of the two spring contact assemblies of FIG. 5 consists of a vibrating body of the cantilever, or reed, type, and it is an elementary and well-known principle of physics that the maximum frequency at which such body can vibrate is determined by the relationship between the mass of its weighted portion and the compliance of its elastic component. In the present instance, it will be clear that as the armature 56 revolves, each contact spring assembly will alternately close and open, or vibrate, each time it is passed by one of the magnets 72 or 73. As the armature 56 accelerates, the motion or vibration thus imparted to the contact spring assemblies will increase in frequency until a frequency is reached beyond which the springs 81 and 82 cannot vibrate enough to close their respective contacts 86 and 87 or 90 and 91. Beyond this speed the flip-flop circuit is controlled by the voltage pulses generated in the coils 52 and 54 or 51 and 53 as the armature 56 revolves and as was described in connection with FIGS. 1 and 3.

Figure 6:
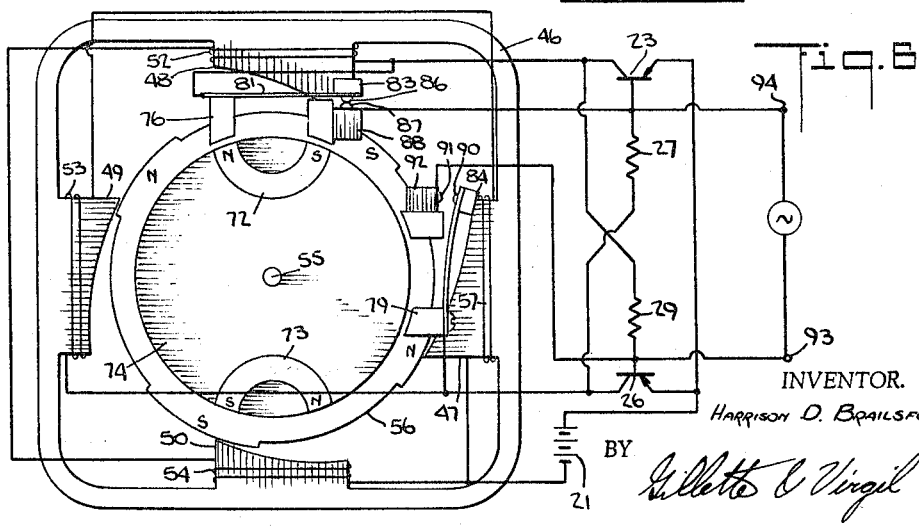

FIG. 6 shows still another modification of the motor in which the base and collector terminals of the two transistors 23 and 26 are used as input, or control, terminals. The switching mechanism of FIG. 6 is similar to the magnetically operated switch of FIG. 5 but because of the different input circuit used, the individual switching mechanisms are connected to opposite transistors from those shown in FIG. 5. Thus, the base of transistor 23 is connected to the fixed contact 87 and the movable contact 86 of that switching unit is connected to the collector of the same transistor 23. Similarly, the base of transistor 26 is connected to the fixed contact 91 and the corresponding movable contact 90 is connected to the collector of the same transistor 26.

With the armature 56 in the position shown in FIG. 6 so that the contacts 86 and 87 are closed, the base of transistor 23 is short-circuited to the collector of the same transistor. As a result, when the motor is connected to the battery 21, transistor 23 will become conductive and transistor 26 will be held in a quiescent or non-conductive state. This is the reverse of the operating conditions of the circuits in FIGS. 4 and 5; there the transistor with its base and emitter terminals initially short-circuited by the switch is kept in the non-conductive state so that it is the other transistor that becomes conductive.

It should also be noted that the circuit of FIG. 6 differs from that of FIG. 5 in that the switch contacts 86 and 87 (and 90 and 91) must carry some base current when they are connected as in FIG. 6 while they need carry no current—or virtually none—when connected as in FIG. 5. Thus the contacts may last slightly longer in the circuits of FIGS. 4 and 5 than in the circuit of FIG. 6, although even in the latter case, the current passing through the contacts 86 and 87 (or 90 and 91) is quite small. The advantage of the circuit in FIG. 6 is that it makes better use of current amplification in the transistors and thus gives higher starting torque than in the embodiments shown in FIGS. 4 and 5.

Current will flow through the coils 52 and 54 in a direction to induce the poles 48 and 50 to assume a north magnetic polarity and the poles 47 and 49 to assume a south magnetic polarity, causing the armature 56 to revolve clockwise. As discussed in connection with FIG. 5, rotation of the armature 56 removes the magnet 72 from the proximity of the brackets 76 and 77 and thus permits the contact 86 to spring away from the contact 87. Momentum of the armature 56 and magnetic attraction between its permanent poles and the poles of the soft iron stator structure 46 will carry the armature through at least an angle of 90° to the point where the flux of the magnet 72 can close the contacts 90 and 91 to energize the transistor 26, which will automatically return the transistor 23 to the quiescent state by virtue of the flip-flop circuit action.

As in the case of the embodiments in FIGS. 1–4, interaction between the permanently magnetized poles of the armature 56 and the magnetic fields produced by the coils 51–54 furnishes driving impulses to keep the armature 56 rotating and, in addition, furnishes actuating impulses to the flip-flop circuit to keep the latter oscillating in proper relationship to armature rotation after the armature has accelerated beyond the maximum speed at which the contacts 86 and 90 can be caused to move.

As in the cases in FIGS. 4 and 5, the connection of the two switching units to the transistors 23 and 26 assists the armature 56 in rotating in the direction of decreasing taper of the air gaps between the ends of the salient poles 47–50 and the periphery of the armature 56. If the switching units were connected in the reverse way, the armature would not be able to move very far (about 30° in the embodiment shown) in the counterclockwise direction before it aligned its poles with the stator poles, where it would tend to stop. As a result, the armature would be constrained to oscillate back and forth in this narrow angle without ever getting sufficient momentum to rotate continuously in either direction.

In the event that it is desired to synchronize the rotation of the armature to an outside source, this may easily be done. Referring again to FIG. 4, two input terminals 93 and 94 are connected to the bases of the transistors 26 and 23, respectively. When the motor is running, an alternating voltage, of nominally square wave form, is generated between these two terminals at a frequency that is directly proportional to the rate of rotation of the armature. I have found that if another alternating voltage having an amplitude equal to or slightly exceeding that produced by the motor is applied across the terminals 93 and 94, the motor will lock into synchronism with and run slave to the externally applied frequency even though subjected to wide variations in applied load or voltage or both. The magnitude of the externally applied voltage need be only a small fraction of that produced by the source 21 to run the motor. Typical values for a motor running on a voltage source 21 of 26 volts D.C. and drawing 3 watts of power would be .5 volt at less than .01 watt.

While the foregoing description covers a specific embodiment of this invention, it will be apparent that changes in details of the illustrated structure may be made without departure from the basic features of the invention. For example, more than two pairs of poles and/or multiple pairs of transistors can be employed. Similarly, while the transistors shown are of the single junction PNP type, NPN units would be equally suitable as would the multiple junction solid state devices such as those types variously designated as "unijunction," "controlled rectifier" and the like.

What is claimed is:

1. A motor comprising an armature having at least one pair of magnetic poles; a stator comprising at least one pair of coils; a running circuit comprising a pair of solid state amplifying devices each having a load circuit and a control circuit, the load circuit of one of said devices being connected in series with one of said coils and the load circuit of the other of said devices being connected in series with the other of said coils; a pair of coupling circuits connecting, respectively, the load circuits of each of said devices to the control circuits of the other of said devices to render said running circuit self-oscillatory; and starting means comprising resiliently biased electrical contact means connected to the control circuits of said devices, and means to actuate said contact means at predetermined positions of said armature at low armature speeds to energize said devices alternately.

2. The motor of claim 1 in which said means to actuate said contact means comprise mechanical arms pivotally attached at centers which move with said armature, said arms following different paths at different armature speeds, and said resiliently biased electrical contact means being located adjacent to said arms to be engaged by said arms when the latter follow the low speed paths.

3. A motor comprising a rotatable, permanently magnetized armature having at least one pair of magnetic poles; a stator comprising a ferromagnetically soft core structure, and at least one pair of coils wound on said ferromagnetically soft core structure; a running circuit comprising a pair of solid state amplifying devices each having a load circuit and a control circuit, the load circuit of one of said devices being connected in series with one of said coils and the load circuit of the other of said devices being connected in series with the other of said coils; a pair of coupling circuits connecting, respectively, the load circuits of each of said devices to the control circuits of the other of said devices to render said running circuit self-oscillatory; a pair of pivot pins fixedly located with respect to said armature to rotate therewith; a pair of arms pivotally mounted on said pins, respectively, and extending on opposite sides of the axis of rotation of said armature; a pair of weights attached to said arms, respectively, each of said weights being on the opposite side of the axis of rotation from the arm to which it is attached to draw said last-named arm toward said axis as the weight moves outwardly as said armature rotates; and resiliently biased electrical contact means connected to the control circuits of said devices and extending adjacent to the path traversed by said arms as said armature rotates at low armature speeds to permit intermittent electrical engagement between said arms and said resiliently biased electrical contact means at low armature speeds to energize said devices alternately.

4. The motor of claim 3 in which said resiliently biased electrical contact means comprise four resiliently biased electrical contacts substantially equidistantly spaced around said axis with two adjacent ones of said contact means connected, respectively, to the control circuits of said devices, and the other two of said contacts are short-circuited together.

5. A motor comprising an armature of ferromagnetic material having a high coercive force, said armature being in the form of a disc with two pairs of permanently magnetized poles substantially equally spaced around the perimeter thereof with diametrically opposite ones of said poles being of the same magnetic polarity; a stator structure comprising a closed ferromagnetically soft core, four salient poles extending inwardly from said core toward said armature and substantially equally spaced thereabout, and a pair of coils wound on said core to induce a magnetic field in said core when said coils are energized, said magnetic field being such as to make opposite ones of said salient poles assume the same magntic polarity with respect to each other and the opposite magnetic polarity with respect to adjacent ones of said salient poles; a flip-flop running circuit comprising a pair of transistors each having an emitter, a collector, and a base; a direct connection between the emitters of both of said transistors; separate connections between the collectors of said transistors and one end of each of said coils, respectively, whereby the emitter-collector circuit of each of said transistors is connected in series with a respective one of said coils; a direct connection short-circuiting the opposite ends of both of said coils together; a pair of impedances connecting, respectively, the collectors of each of said transistors to the bases of the other of said transistors to make said flip-flop circuit self-oscillatory; and starting means comprising a pair of pivot pins fixedly located with respect to said armature and on diametrically opposite sides of the axis of rotation thereof, a pair of arms pivotally attached to said pins, respectively, a pair of weights attached to said arms, respectively, said arms extending on opposite sides of said axis of rotation from the weights attached to said arms whereby as said weights move outwardly under centrifugal force said arms move inwardly toward said axis, an electrical connection short-circuiting said arms together, four resilient spring wires substantially equidistantly spaced around said axis and extending toward said arms to make electrical contact therewith when said armature rotates at low speeds, said wires being positioned so as not to make contact with said arms at high armature speeds, a direct connection short-circuiting two adjacent ones of said arms together to said emitters, a direct connection from a third one of said spring wires to the base of one of said transistors, and another direct connection from the remaining one of said wires to the base of the other of said transistors whereby the base of each of said transistors is alternately short-circuited to the emitter of the same transistor to render said transistors non-conductive alternately.

6. A motor comprising an armature having at least one pair of magnetic poles; a stator comprising at least one pair of coils; a running circuit comprising a pair of solid state amplifying devices each having a control circuit including a base electrode and a load circuit including an emitter electrode and a collector electrode, the emitter and collector electrodes of one of said devices being connected in series with one of said coils and the emitter and collector electrodes of the other of said devices being connected in series with the other of said coils; a pair of coupling circuits connecting, respectively, the load circuit of each of said devices to the control circuit of the other of said devices to render said circuit oscillatory; and starting means comprising a pair of switches, each having resiliently biased electrical contact means connected, respectively, in series between the base electrode of one of said devices and the collector electrode of the same device, and means to close said switches in alternation at predetermined positions of said armature at low armature speeds to energize said devices alternately.

References Cited by the Examiner

UNITED STATES PATENTS

| | | | |
|---|---|---|---|
| 2,704,334 | 3/1955 | Brailsford | 318—254 |
| 2,719,944 | 10/1955 | Brailsford | 318—138 |
| 2,991,414 | 7/1961 | Tillman | 331—113 |
| 2,995,690 | 8/1961 | Lemon | 318—138 |
| 3,054,916 | 9/1962 | Cobb | 310—111 |
| 3,067,370 | 12/1962 | Quittner | 318—138 |
| 3,090,897 | 5/1963 | Hammann | 318—341 |
| 3,124,733 | 3/1964 | Andrews | 318—254 X |
| 3,135,842 | 6/1964 | Brailsford | 318—254 X |

ORIS L. RADER, *Primary Examiner.*

C. ROHRER, G. RUBINSON, *Assistant Examiners.*